(12) United States Patent
Chisnall et al.

(10) Patent No.: US 12,039,170 B2
(45) Date of Patent: Jul. 16, 2024

(54) HARDWARE REVOCATION ENGINE FOR TEMPORAL MEMORY SAFETY

(71) Applicant: Microsoft Technology Licensing, LLC, Redmond, WA (US)

(72) Inventors: David Thomas Chisnall, Cambridge (GB); Hongyan Xia, Cambridge (GB); Nathaniel Wesley Filardo, Cambridge (GB); Robert McNeill Norton-Wright, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 17/934,355

(22) Filed: Sep. 22, 2022

(65) Prior Publication Data

US 2023/0393746 A1 Dec. 7, 2023

Related U.S. Application Data

(60) Provisional application No. 63/349,537, filed on Jun. 6, 2022.

(51) Int. Cl.
*G06F 9/38* (2018.01)
*G06F 3/06* (2006.01)
(Continued)

(52) U.S. Cl.
CPC .......... *G06F 3/0611* (2013.01); *G06F 3/0629* (2013.01); *G06F 3/0673* (2013.01);
(Continued)

(58) Field of Classification Search
None
See application file for complete search history.

(56) References Cited

U.S. PATENT DOCUMENTS 11,163,569 B2  11/2021  Lemay et al.
11,200,158 B1  12/2021  Lie et al.
(Continued)

OTHER PUBLICATIONS

Liu et al. "A Robust and Efficient Defense against Use-after-Free Exploits via Concurrent Pointer Sweeping." Oct. 2018. ACM. CCS '18. pp. 1635-1648.*
(Continued)

*Primary Examiner* — Nathan Sadler
(74) *Attorney, Agent, or Firm* — Barta Jones, PLLC

(57) ABSTRACT

A hardware revocation engine for invalidating a pointer, that refers to a deallocated object, from memory in a memory constrained system. The hardware revocation engine has a revocation pipeline coupled to a pipeline of a main processor of the memory constrained system. The revocation pipeline shares access to memory with the main pipeline, the revocation pipeline comprising at least a first stage and a subsequent second stage. In a first cycle of the revocation pipeline, the first stage of the revocation pipeline loads a first pointer-sized value from the memory. In a second cycle: the second stage checks whether the first loaded pointer-sized value is a pointer referring to deallocated memory. In a third cycle: in response to the outcome of the check indicating that the first loaded pointer-sized value is a pointer referring to deallocated memory, the first stage invalidates the first pointer-sized value.

20 Claims, 9 Drawing Sheets

(51) Int. Cl.
*G06F 12/14* (2006.01)
*G06F 21/52* (2013.01)

(52) U.S. Cl.
CPC .......... *G06F 9/3867* (2013.01); *G06F 12/145* (2013.01); *G06F 21/52* (2013.01); *G06F 2212/1032* (2013.01); *G06F 2212/1052* (2013.01)

(56) References Cited

U.S. PATENT DOCUMENTS

| 2008/0126736 | A1* | 5/2008 | Heil | G06F 12/0253 711/171 |
|---|---|---|---|---|
| 2017/0177368 | A1* | 6/2017 | DeHon | G06F 12/1408 |
| 2022/0121644 | A1 | 4/2022 | Boivie et al. | |

OTHER PUBLICATIONS

"Application as Filed in U.S. Appl. No. 17/385,765", filed Jul. 26, 2021, 38 Pages.

Boivie, et al., "Hardware Support for Low-Cost Memory Safety", In Proceedings of 51st Annual IEEE/IFIP International Conference on Dependable Systems and Networks—Supplemental vol. Jun. 21, 2021, 4 Pages.

Nagarakatte, et al., "Watchdog: Hardware for Safe and Secure Manual Memory Management and Full Memory Safety", In Proceedings of 39th Annual International Symposium on Computer Architecture, Jun. 9, 2012, 12 Pages.

Prakash, Raj, "Using Silicon Secured Memory to Detect Memory Access Errors at Hardware Speeds", Retrieved from: https://community.oracle.com/tech/developers/discussion/4462257/using-silicon-secured-memory-to-detect-memory-access-errors-at-hardware-speeds, Feb. 25, 2016, 18 Pages.

Sharifi, et al., "CHEx86: Context-Sensitive Enforcement of Memory Safety via Microcode-Enabled Capabilities", In Proceedings of ACM/IEEE 47th Annual International Symposium on Computer Architecture, May 30, 2020, 14 Pages.

Watson, et al., "Capability Hardware Enhanced RISC Instructions: CHERI Instruction-Set Architecture Version 9—Draft", In Technical Report of SRI International University of Cambridge, and Arm Limited, May 27, 2022, 618 Pages.

Amar, Saar, "What's the Smallest Variety of CHERI ?", Retrieved from: https://msrc-blog.microsoft.com/2022/09/06/whats-the-smallest-variety-of-cheri/, Sep. 6, 2022, 11 Pages.

Watson, et al., "Capability Hardware Enhanced RISC Instructions: CHERI Instruction-Set Architecture (Version 8)", In Technical Reports of University of Cambridge, UCAM-CL-TR-951, Oct. 2020, 590 Pages.

Erdös, et al., "Minesweeper: a "clean sweep" for drop-in use-after-free prevention", In Proceedings of the 27th ACM International Conference on Architectural Support for Programming Languages and Operating Systems, Feb. 28, 2022, pp. 212-225.

Filardo, et al., "Cornucopia: Temporal Safety for CHERI Heaps", In proceedings of IEEE Symposium on Security and Privacy (SP), May 18, 2020, pp. 608-625.

"International Search Report and Written Opinion Issued in PCT Application No. PCT/US23/018786", Mailed Date: Aug. 2, 2023, 13 Pages.

Xia, "CHERivoke Characterising Pointer Revocation using CHERI Capabilities for Temporal Memory Safety", In Proceedings of the 52nd Annual IEEE/ACM International Symposium on Microarchitecture, Oct. 12, 2019, pp. 545-557.

* cited by examiner

HARDWARE REVOCATION ENGINE FOR TEMPORAL MEMORY SAFETY

CROSS-REFERENCE TO RELATED APPLICATION

This application claims the benefit of U.S. provisional application No. 63/349,537 filed on Jun. 6, 2022, entitled "Hardware revocation engine for temporal memory safety" the entirety of which is hereby incorporated by reference herein.

BACKGROUND

Temporal memory safety concerns how to secure an application even where memory locations contain different data at different times during program execution. When memory is freed by an application and later reallocated, it is potentially possible that the memory is accessed with the aim that the original data is present. Consider the case where a program holds a pointer to some memory, frees the memory but then keeps the pointer and tries to access through the pointer again. The result is a use-after-free bug (or use-after-reallocate if the memory has been given to the application again). Such undefined behaviour has the potential to leak information or to enable an attacker to take control of the application.

The embodiments described below are not limited to implementations which solve any or all of the disadvantages of known ways of enhancing temporal memory safety.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a hardware revocation engine for invalidating a pointer, that refers to a deallocated object, from memory in a memory constrained system. The hardware revocation engine has a revocation pipeline coupled to a pipeline of a main processor of the memory constrained system. The revocation pipeline shares access to memory with the main pipeline, the revocation pipeline comprising at least a first stage and a second stage subsequent to the first stage. The revocation pipeline is configured such that: in a first cycle of the revocation pipeline, the first stage of the revocation pipeline loads a first pointer-sized value from the memory. In a second cycle of the revocation pipeline: the second stage checks whether the first loaded pointer-sized value is a pointer referring to deallocated memory and informs the first stage an outcome of the check; and the first stage loads a second pointer-sized value from the memory. In a third cycle of the revocation pipeline: in response to the outcome of the check indicating that the first loaded pointer-sized value is a pointer referring to deallocated memory, the first stage invalidates the first pointer-sized value; and the second stage checks whether the second loaded pointer-sized value is a pointer referring to deallocated memory.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
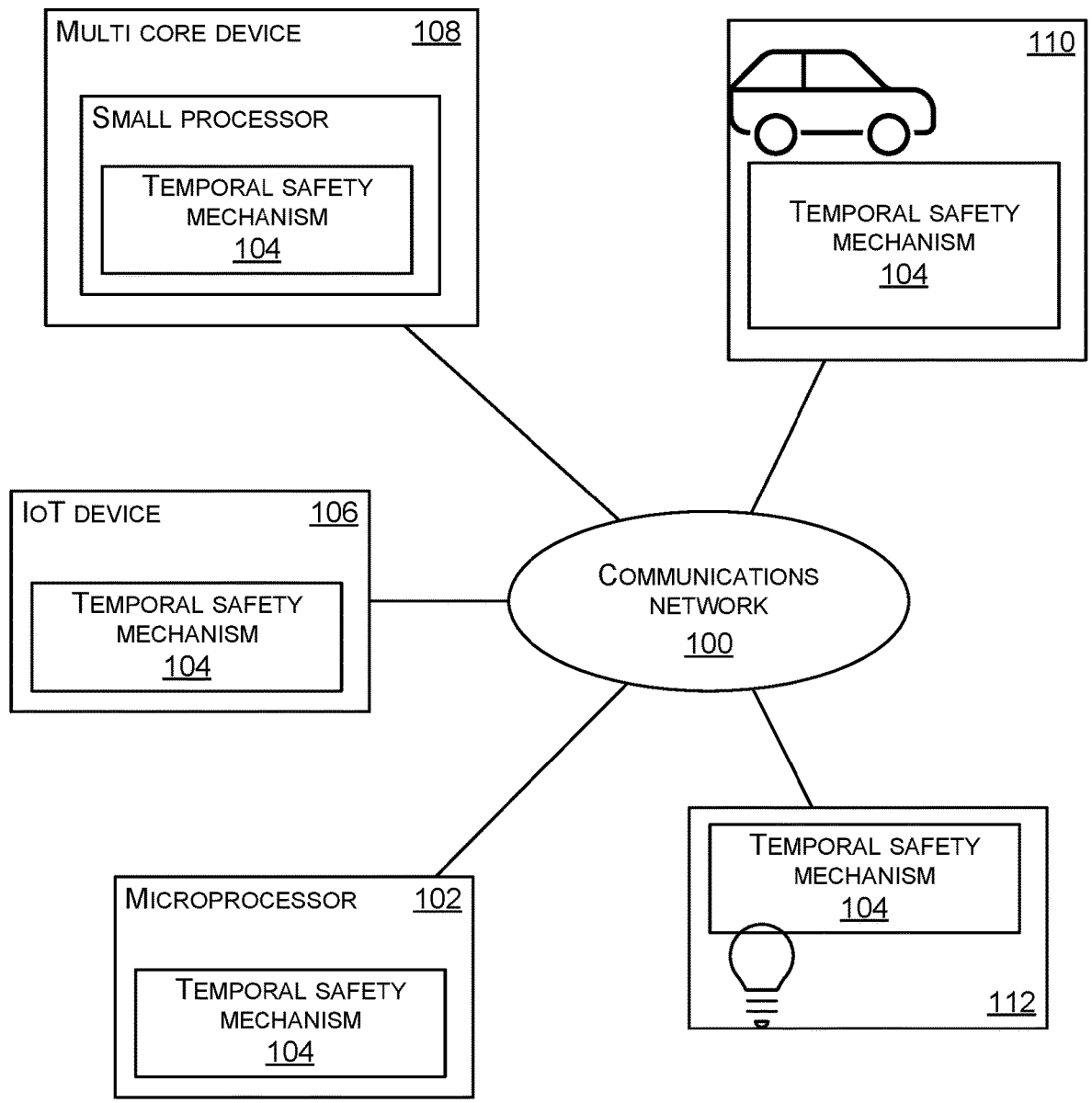
FIG. 1 is a schematic diagram of a temporal safety mechanism deployed in a variety of different computing devices.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

The term "pipeline" is used to refer to a plurality of computing stages connected in series that, together, implement one logical step of a computation, for example an instruction executing on a central processing unit (CPU). When operating efficiently a pipelined computer has an instruction in each stage so that it works on each of those instructions at the same time achieving so called "pipeline parallelism".

As mentioned above, temporal safety is extremely useful to secure an application even where memory locations contain different data at different times during program execution. However, it is difficult to improve temporal safety without introducing significant performance loss and/or memory use.

In various examples described herein temporal safety is improved by using a shadow memory. When memory of an object is deallocated one or more shadow bits are set in the shadow memory to indicate the locations of deallocated memory. In an example, a granule size is 8 bytes and an object of 24 bytes is deallocated. In this case three bits are set in the shadow memory indicating three 8-byte memory locations have been freed. A scan is made through the memory (main memory of the computing system) by looking through the memory to check whether there are any pointers to any of the freed objects noted in the shadow memory. If so, the identified pointers are invalidated. Such a scan is referred to herein as a revocation scan, since the memory is scanned to identify and invalidate pointers to deallocated objects.

However, scanning the memory is typically time consuming and so is not practical for many applications. Consider a 100 megahertz processor with ½ megabyte of memory where scanning the memory may take around a millisecond. A millisecond latency is not acceptable for applications where a response is needed in $1/10^{th}$ of a millisecond such as to automatically operate brakes in a vehicle.

Another point is that scanning the memory to invalidate pointers to deallocated memory is generally something which has to be done when a central processing unit CPU of a computing device is not executing (since otherwise the CPU might make changes that conflict with the scan). However, it is generally undesirable to stall operation of a CPU since this prevents use of the computing device.

The inventors have developed a hardware revocation engine which enables low latency revocation scanning of memory in memory constrained systems. The hardware revocation engine is a pipeline with at least two stages and is configured to share access to memory with a pipeline of a main processor of the memory constrained system. The hardware revocation engine either operates when the pipeline of the main processor is stalled, or operates in the background whilst the pipeline of the main processor is executed. Instructions flow through pipeline of the main processor but the hardware revocation engine pipeline is not executing instructions. Thus the revocation engine pipeline gives a performance/power win: it is executing a state machine and so does not need to fetch and decode instructions or execute instructions that just exist to define the state machine in software. Since the hardware revocation engine pipeline shares access to memory with the pipeline of the main processor, extra read/write ports on the memory are not needed.

A memory constrained system is a computing system with a limited amount of memory such as 64 kilobytes to 512 kilobytes of memory and up to a few Mebibytes (MiBs) of memory. A memory constrained system may be an internet of things computing device such as a processor embedded in a streetlamp, kitchen toaster, lightbulb or other object. Other examples of memory constrained systems are given with reference to FIG. 1 below.

FIG. 1 is a schematic diagram of a temporal safety mechanism 104 deployed in a variety of different computing devices. The temporal safety mechanism comprises a shadow memory which comprises a shadow bit map indicating, for each memory location, whether the memory location is deallocated memory. The temporal safety mechanism also comprises a hardware revocation engine which operates to invalidate pointers that point to deallocated memory in an extremely efficient manner. In an example where the computing device has a Capability Hardware Enhanced Reduced instruction set computer Instructions (CHERI) architecture, one bit in the shadow memory defines whether a pointer sized value is a pointer or not. A second bit is added to indicate whether the memory region is deallocated or not.

In the example of FIG. 1 the temporal safety mechanism is deployed in an internet of things device 106, a microprocessor 102, a light bulb 112, a motor vehicle 110 and a small processor within a multi core device 108. These examples are given to indicate a range of computing systems where the temporal safety mechanism is deployable and are not intended to be limiting. The computing devices of FIG. 1 are shown as being connected to a communications network 100 such as the internet, an extranet or any other communications network 100 although that is not essential.

The temporal safety mechanisms 104 act to improve security of applications executing on the computing devices and of data used by applications executing on the computing devices.

As mentioned above, in various examples, a revocation pipeline is configured such that: in a first cycle of the revocation pipeline, the first stage of the revocation pipeline loads a first pointer-sized value from the memory. In a second cycle of the revocation pipeline: the second stage checks whether the first loaded pointer-sized value is a pointer referring to deallocated memory and informs the first stage an outcome of the check; and the first stage loads a second pointer-sized value from the memory. In a third cycle of the revocation pipeline: in response to the outcome of the check indicating that the first loaded pointer-sized value is a pointer referring to deallocated memory, the first stage invalidates the first pointer-sized value; and the second stage checks whether the second loaded pointer-sized value is a pointer referring to deallocated memory. Note that this sequence does not have to happen in order.

Note that a 'cycle of the revocation pipeline' refers to a processing period of the revocation pipeline which is separate from the main processor pipeline and therefore is not a cycle number referring to a time increment of the main processor pipeline. The first cycle is an operation that happens once per revocation pass, once the pipeline is running then every cycle the first stage will either load a new pointer-sized value or store back an invalidated pointer, the second will do either nothing (if the first stage wrote back an invalidated pointer in the previous cycle, or if the item loaded by the first stage last cycle is not a pointer) or check whether a pointer is valid (if the loaded thing is a pointer).

Note that it may take more than one cycle to load a value from memory. In an example, two cycles are used to load a pointer from memory in which case:

revocation cycle 1: stage 1 loads half a pointer, stage 2 does nothing.

revocation cycle 2: stage 2 load the other half, stage 2 does nothing.

In either of these cases, if the pipeline loads, pause for a cycle, if the pipeline stores then check whether it's the address being used. If it is, then skip to the next location. If it isn't, then stall for a cycle.

revocation cycle 3: stage 1 loads the first half of the next pointer, stage 2 checks the pointer (if it really is a pointer) and reports back to stage 1 that this is really a pointer.

revocation cycle 4: stage 1 writes back an invalid value (in some embodiments it is possible to store an invalid value in one cycle; in other embodiment use two in the two-cycles-to-load-a-pointer case) or loads a new value, stage 2 does nothing.

In embodiments where there is a wide memory bus then stage one is able to load two pointer-sized items, stage 2 might then check them one per cycle, so the first stage may be blocked waiting for the second stage to check both values in some cases, or might be racing ahead scanning non-pointer memory very quickly while the second stage does nothing.

Figure 2:
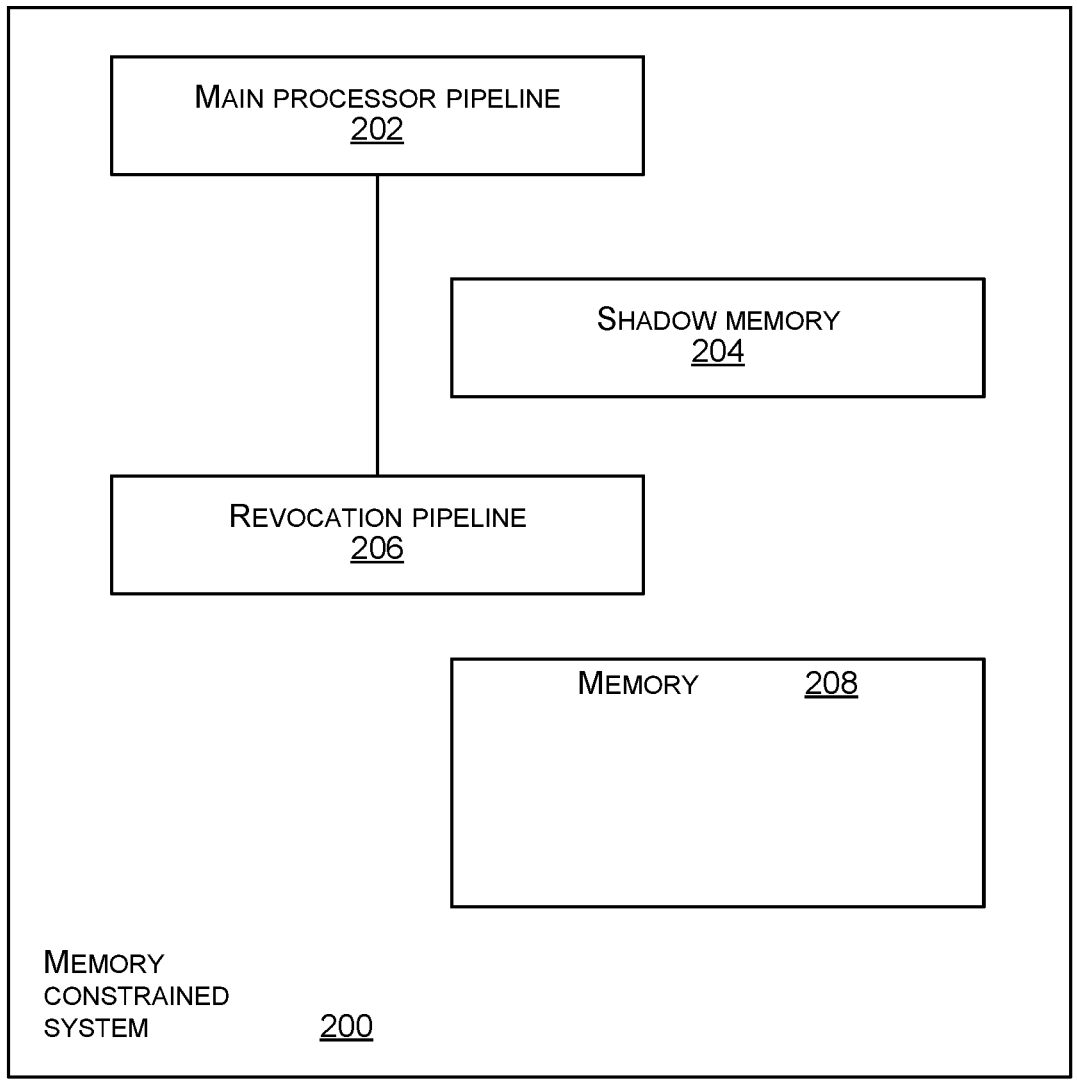
FIG. 2 is a schematic diagram of a memory constrained device having a temporal safety mechanism.

FIG. 2 is a schematic diagram of a memory constrained system 200 having a temporal safety mechanism. The memory constrained system 200 comprises a main processor pipeline 202, a shadow memory 204, a revocation pipeline 206 and a memory 208. The main processor pipeline 202 and the revocation pipeline 206 share the memory 208. The shadow memory 204 is part of memory 208. Memory 208 is any suitable type of memory such as static (SRAM) or Dynamic (DRAM) Random Access Memory.

The main processor pipeline 202 comprises two or more stages connected in series so that instructions flow through the pipeline according to the stages. In a non-limiting example the main processor pipeline 202 is a central processing unit pipeline.

The revocation pipeline 206 comprises two or more stages connected in series. The revocation pipeline 206 is coupled to the main processor pipeline. In an example the revocation pipeline is deployed within a main processor of the memory constrained system together with the main processor pipeline.

The revocation pipeline of the disclosure operates in an unconventional manner to achieve efficient invalidation of pointers to deallocated memory of the disclosure.

The revocation pipeline improves the functioning of the underlying computing device by invalidating pointers to deallocated memory.

Figure 3:
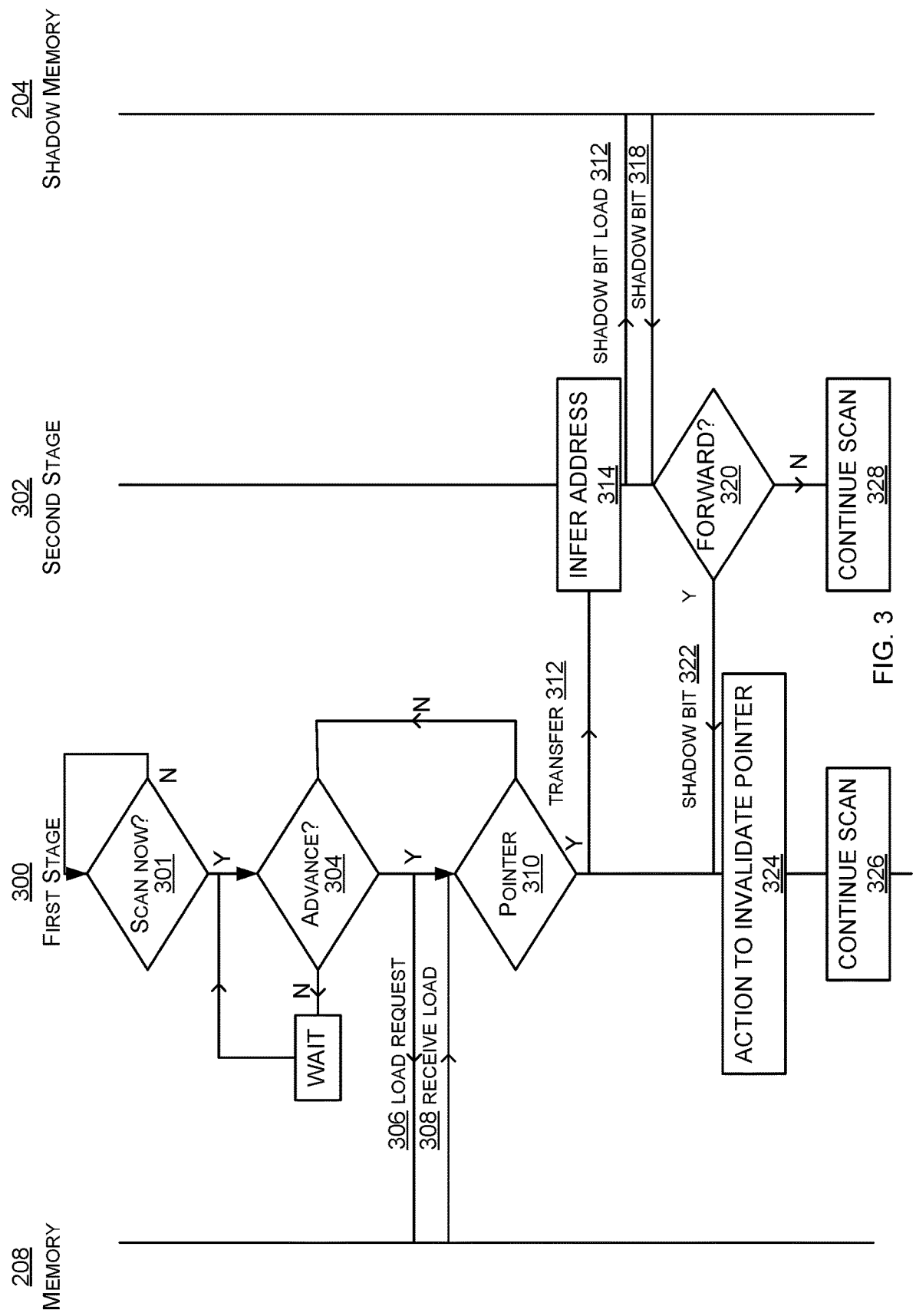
FIG. 3 is a sequence chart of an example process performed by a revocation pipeline.

FIG. 3 is a sequence chart of an example process performed by a revocation pipeline. In the example of FIG. 3 there is no pipeline parallelism shown in the revocation pipeline for clarity of the figure and description. FIGS. 4 to 7 show another example where the revocation pipeline does exploit pipeline parallelism.

FIG. 3 has a vertical line to represent memory 208, a vertical line to represent a first stage 300 of a revocation pipeline, a vertical line 302 to represent a second stage of a revocation pipeline and a vertical line to represent a shadow memory 204. Memory 208 is shared by the revocation pipeline and a pipeline of a main processor of a memory constrained system.

The first stage 300 of the revocation pipeline checks 301 whether criteria are met to begin a scan of the memory 208 to invalidate any pointers in the memory which point to deallocated memory. In an example, the criteria are met when the revocation pipeline receives a request to begin a revocation scan from the pipeline of the main processor. In another example, the criteria are met when a specified number of clock cycles of the memory constrained system have elapsed. If the check 301 results in a decision to go ahead with a scan, a second check 304 is done. The second check decides whether to advance the active scan which can be done when the revocation pipeline detects that the pipeline of the main processor is not accessing the memory 208.

In response to the criteria not being met at check 304, the first stage of the revocation pipeline waits and then repeats the check 304.

In response to the criteria being met at check 304, the first stage of the revocation pipeline sends a load request 306 to the memory 208 to load a pointer-sized value from the memory 208. The memory returns the requested value to the first stage 300 using message 308 "receive load".

The first stage checks 310 whether the pointer-sized value is a pointer or a non-pointer value. In a non-limiting example, this check may be performed on a CHERI architecture by examining a tag bit of the pointer-sized value loaded in operations 306 and 308: a set bit indicates a pointer while a clear bit indicates an integer. If the pointer-sized value is an integer or other non-pointer value the first stage returns to operation 306 and sends a request to load another pointer-sized value from the memory. The first stage makes the load requests sequential so that eventually the whole of memory 208, or the whole of a specified range of the memory 208, is scanned. Any suitable sequence is used such as numerical order, even memory locations followed by odd memory locations or any other order which enables the memory to be scanned.

If the pointer-sized value is a pointer at check 310, the first stage of the revocation pipeline makes the pointer available to the second, subsequent stage of the revocation pipeline as indicated by arrow 312 "transfer" in FIG. 3. In an example the first stage puts the pointer in a register which is accessible to the second stage.

The second stage 302 infers 314 an address that would be in-bounds for this transferred 312 pointer. The inference is done by mapping the pointer to its ancestral provenance i.e. which memory allocation it came from, even if an application has subsequently taken it out of bounds. In a non-limiting example, on a CHERI architecture, a base address, which is the lowest address to which this pointer authorizes access, is one such address and is available with the pointer. The second stage 302 queries the shadow memory 204 using the inferred in-bounds address. This is done by sending a shadow bit load request 316 from the second stage 302 to the shadow memory 204.

The shadow memory 204 receives the load request 316 and returns 318 a shadow bit of the base address from the shadow memory 204. The second stage 302 examines the shadow bit at decision point 320. If the shadow bit indicates that the pointer points to allocated memory the second stage waits for a next cycle of the hardware revocation engine without informing the first stage and the scan continues 328 by the first stage returning to operation 306. The first stage 300 knows to return to operation 306 because the first stage 300 is, every cycle, doing one of the following things in descending priority order: 1. Writing an invalid pointer 324 to main memory 208, when the second stage raises its flag (in operation 322) and the main pipeline is not accessing main memory. 2. Reading (operations 306 and 308) the next pointer-sized chunk of main memory 208, when the second stage 302 is not flagging (operation 322) and the main pipeline is not accessing main memory. 3. Waiting (at operation 312) for the second stage 302 to accept a pointer for processing. The second stage 302 may also interlock with the main pipeline for access to the shadow memory 204, and so may not be in a position to accept the next pointer from the first stage 300. When this happens, the first stage 300 cannot advance beyond the decision at operation 310. (If the shadow memory 204 has two "read ports", it can service both the main pipeline and the revocation pipeline in the same cycle and this consideration does not apply.) 4. Waiting for the main pipeline to not be accessing memory (operation 304). 5. Waiting for the main pipeline to indicate that revocation should be active at this moment (operation 301).

If the shadow bit indicates that the pointer points to deallocated memory the second stage communicates the address to invalidate back to the first stage. If the revocation pipeline is following a regular memory access pattern (such as a linear scan) then the location is encoded efficiently using knowledge of the access pattern.

In an example, the second stage 302 flags 322 the shadow bit to the first stage 300. By using a flag the second stage 302 informs the first stage 300 about the shadow bit. It is not essential to use a flag as other ways of informing the first stage 300 are possible. The first stage then takes action 324 to invalidate the pointer after which it continues 326 with the scan by returning to operation 306. The first stage 300 knows the address of the last N pointers it loaded, with N equal to the number of pipeline stages: the most recently loaded pointer is the one that is in the register of step 312 and the one before that is the one that the second stage 302 has just finished processing and matters for operation 322. (If there are more stages, because, say, 314 is complicated and takes a lot of gates and so a lot of time to compute, then N increases, 312 remains tied to the most recently loaded pointer, and operation 322 remains tied to the Nth most recent.) When the second stage 302 flags a pointer in operation 322, the first stage 300 uses the address of the 2nd-most-recently-loaded pointer as the address of the store operation in the action 324 to invalidate the pointer.

There are various different ways the first stage can use to invalidate the pointer loaded from a given memory location. By example, these may comprise one or more of: writing a non-pointer value (such as the integer zero) to the memory location, erasing any pointer-distinguishing tag (as in CHERI or other tagged architectures), removing any in-pointer permission flags that render the pointer unauthorized to access its target, adjusting the authorized bounds of the pointer to be zero-length (rendering the pointer unauthorized to access any memory).

Each of FIGS. 4 to 7 shows a pipeline 202 of a main processor of a memory constrained system. In this example the pipeline 202 of the main processor (referred to as the main pipeline) has five stages which are fetch, decode, execute, memory and write-back. However, it is not essential to use five stages as fewer stages or more stages are used in some examples.

Each of FIGS. 4 to 7 also shows a revocation pipeline 206 comprising at least two stages although more than two stages may be used. A first stage of the revocation pipeline 300 precedes a second stage 302 of the revocation pipeline. The first stage 300 of the revocation pipeline has a port to a memory shared by the main pipeline and the revocation pipeline, but the second stage 302 does not. A number of memory ports is thereby reduced which is beneficial for reducing cost.

In the example of FIGS. 4 to 7 the first stage of the revocation pipeline is in parallel with a memory stage of the main pipeline and the second stage of the revocation pipeline is in parallel with a write-back stage of the main pipeline. Alignment of the revocation pipeline first stage and the main pipeline's memory stage, improves efficiency where the revocation pipeline first stage "snoops" on the main pipeline memory stage actions (the interlock of 304).

The revocation pipeline of FIGS. 4 to 7 is a four state finite state machine. Each of the four states is illustrated in one of FIGS. 4 to 7. Note that the example of FIGS. 4 to 7 is for a two stage revocation pipeline. However, it is also possible to have a revocation pipeline with more than two stages by dividing the stages.

Figure 4:
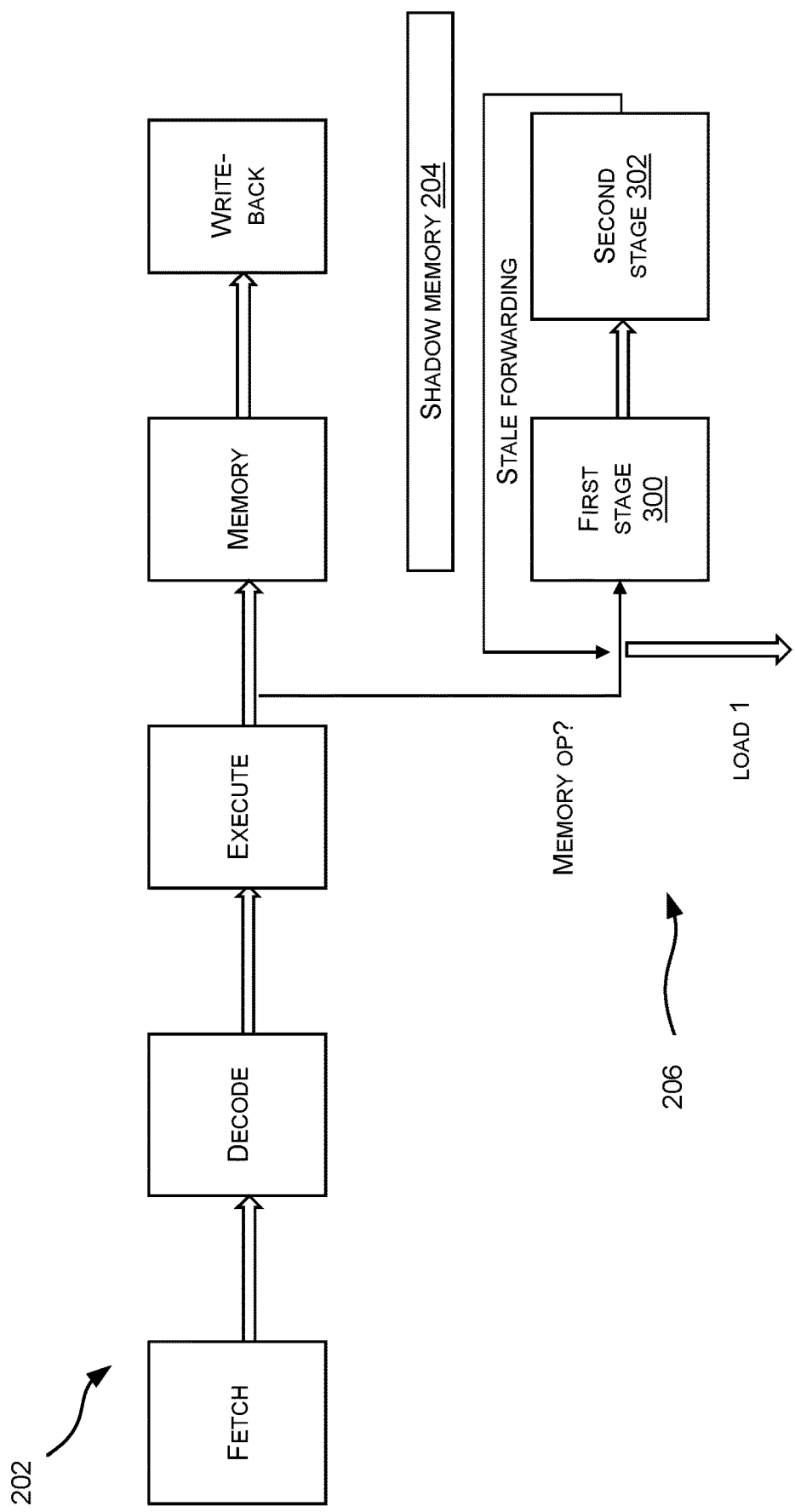
FIG. 4 is a schematic diagram of a first state of a revocation pipeline which is a state machine with four states.

FIG. 4 also shows a first state of the revocation pipeline 206, state 0, also referred to as a reset state. During the reset stage the revocation pipeline is not doing any substantive scanning work. During the reset stage the revocation pipeline checks for criteria to be met as at check 304 of FIG. 3 in order to decide whether to begin scanning work.

In the example of FIG. 4 the first stage of the revocation pipeline checks whether the main pipeline is making any memory operation by watching the memory port (which is shared between the main processing pipeline and the revocation pipeline). If the main pipeline is not making any memory operation the first stage of the revocation pipeline issues a load request (see arrow marked load 1 in FIG. 4) and advances the state of the state machine to state one. The load request is made at start point of a region of memory to be scanned. In an example the start point is a lower bound address of a region of memory to be scanned and the lower bound address is provided by software executing on the memory constrained system. Note that the start point is an initial load address provided by software and is different from subsequent load addresses computed during a revocation scan using a sequence as described above.

Figure 5:
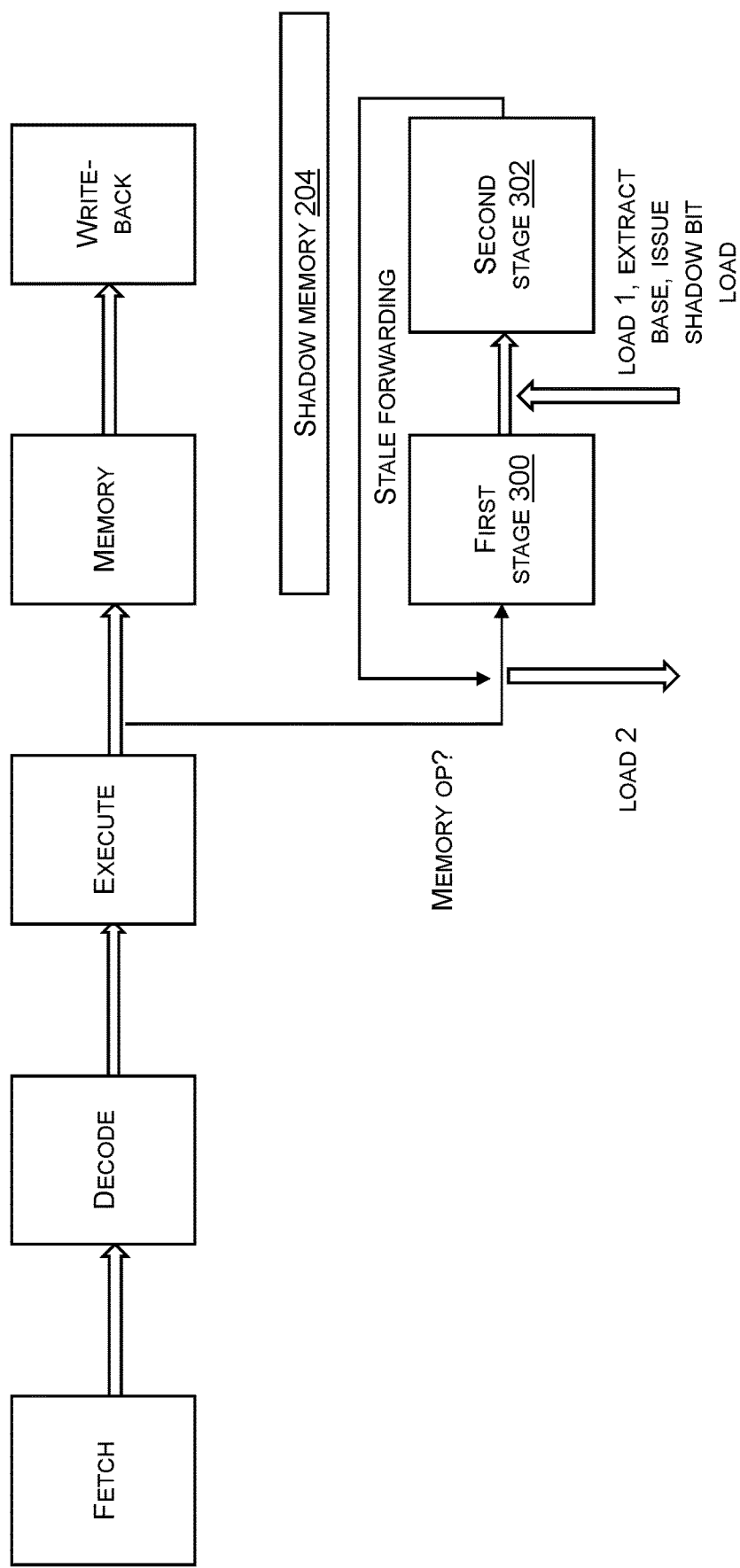
FIG. 5 is a schematic diagram of a second state of a revocation pipeline which is a four state, finite state machine.

FIG. 5 shows a state one of the revocation pipeline referred to as "second load". During state one, the load request load 1 comes back and the first stage issues a second load request (see load 2 in FIG. 5) for a next portion of memory in the memory to be scanned. Meanwhile, the first stage of the revocation pipeline receives the returned value resulting from load request 1 and checks whether it is a pointer or a non-pointer value (as at check 310 of FIG. 3). If the values is a non-pointer value then the revocation pipeline remains in state one, load request 1, and requests another load request 1. If the value is a pointer the base of the pointer is extracted by the second stage and the second stage issues a shadow bit load (as at 316 in FIG. 3). The revocation pipeline then transitions to state 2 "$1^{st}$ store" as illustrated in FIG. 6.

Figure 6:
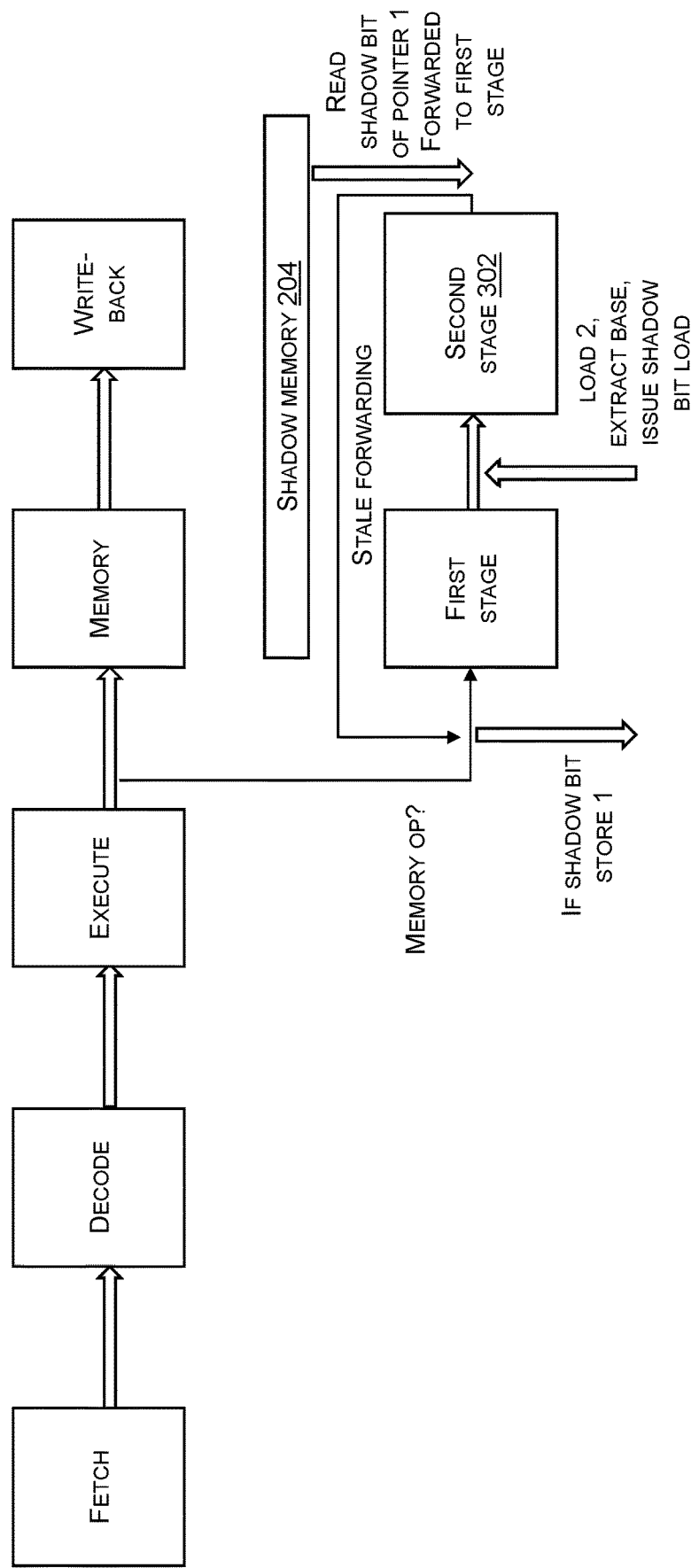
FIG. 6 is a schematic diagram of a third state of a revocation pipeline which is a four state, finite state machine.

FIG. 6 shows a third state of the revocation pipeline referred to as state 2 "$1^{st}$ store". During this state the second load request comes back (as indicated by the arrow load 2). A shadow bit of the first pointer is read (see arrow read shadow bit) and if the shadow bit indicates the pointer points to deallocated memory, the shadow bit is forwarded (see arrow marked stale forwarding) to the first stage and the first stage takes action to invalidate the pointer as described with reference to FIG. 3 operation 324.

Figure 7:
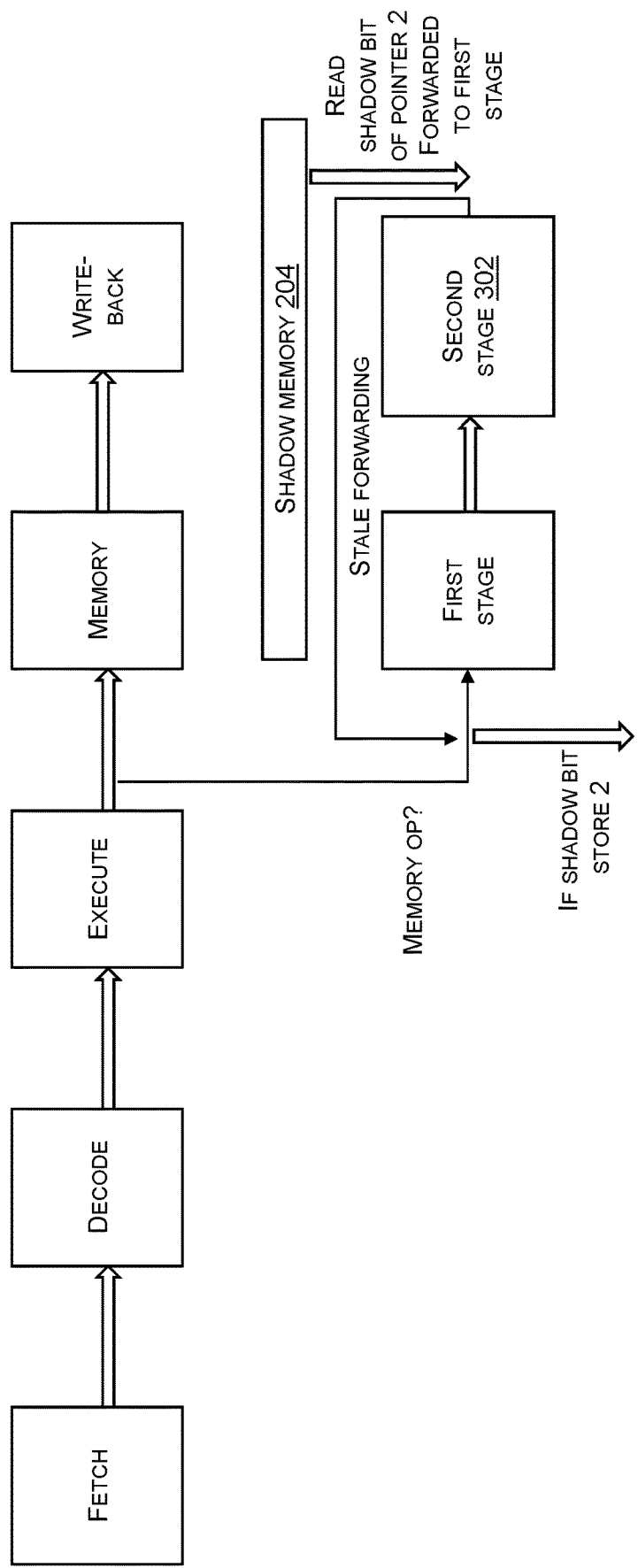
FIG. 7 is a schematic diagram of a fourth state of a revocation pipeline which is a four state, finite state machine.

When the shadow bit has been read the revocation pipeline transitions to a fourth state referred to as state 3 "$2^{nd}$ store" as illustrated in FIG. 7.

FIG. 7 shows a fourth state of a revocation pipeline. In this state a shadow bit of a second pointer is loaded or read from the shadow memory as indicated by the arrow marked "read shadow bit". In this state the second stage of the revocation pipeline forwards the shadow bit of the second pointer to the first stage if the shadow bit indicates deallocated memory (see the arrow marked stale forwarding). The first stage then takes action to invalidate the pointer as described with reference to FIG. 3 operation 324 and returns to the reset state of FIG. 4. On return to the reset state the load request of operation 306 advances by two words, where there is one word per pointer-sized value in the memory.

Another explanation of the states illustrated in FIGS. 4 to 7 is now given from the perspective of where the pointers are in the revocation pipeline. In this explanation state 2 is divided into states 2 and 2'. In addition to the state of the state machine the memory constrained system tracks a last loaded address, A. The size of a pointer is denoted SP. The memory constrained system ensures that the revocation state machine is stalled if the main pipeline has memory requests. If the main pipeline issues a store to regions of the memory associated with pointers which are "in flight" in the revocation pipeline the revocation pipeline is reset to state 0 and A is reset to A—(2 SP).

State 0: Reset, no pointer held in either stage.
Second stage is idle this cycle.
First stage loads SP bytes at A+SP.
Update A to A+SP.
If load is data,
　Stay in state 0;
Otherwise, Move to state 1.
State 1: Pointer in first stage, no pointer in second stage.
Second stage is idle this cycle.
Transfer pointer from first stage to second stage.
First stage loads SP bytes at A+SP.
Update A to A+SP.
If load is pointer,
  Move to state 2;
Otherwise
  Move to state 2'.
State 2: Pointer in second stage, first stage in sync and has pointer:
Second stage loads from shadow.
Transfer pointer from first stage to second stage.
If shadow OK, behave like state 1:
  First stage loads SP bytes at A+SP.
  Update A to A+SP.
  If load is pointer,
    Stay in state 2;
  Otherwise
    Move to state 2'.
If not OK, first stage writes invalid pointer at A—SP and
  Move to state 3.
State 2': Pointer in second stage, first stage in sync but without pointer. State 2' is very much like state 2, differing only in transitions to account for the missing pointer that will idle the 2nd stage.
Second stage loads from shadow.
Transfer pointer from first stage to second stage.
If shadow OK, behave like state 1:
  First stage loads SP bytes at A+SP.
  Update A to A+SP.
  If load is pointer,
    Move to state 1;
  Otherwise
    Move to state 0.
If not OK, first stage writes invalid pointer at A—SP and
  Move to state 0.
State 3: Pointer in second stage, first stage "lagging" and, so, without pointer:
Behave like 2', but with invalidation occurring at A, because no additional load took place, and so A has not advanced by SP.

In an example, the revocation state machine stays in state 0 while it's just encountering non-pointer values and in state 2 while it's just encountering pointers that don't need to be revoked. State 1 occurs at the transition from 0 to 2; state 2' occurs at transition in the other direction, dealing with the "bubble" introduced into the pipeline when the first stage reads data after a pointer; and state 3 exists to deal with bubbles arising when the first stage was obligated to revoke, writing to, rather than reading from, main memory.

Figure 8:
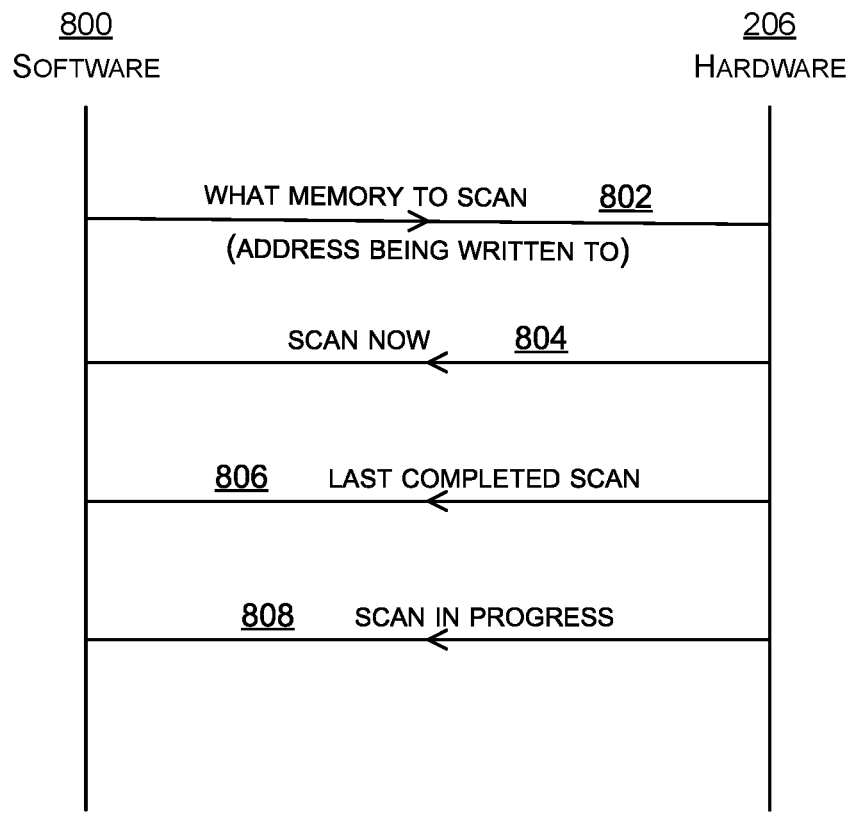
FIG. 8 is a diagram of software interfacing with a hardware revocation pipeline.

FIG. 8 is a diagram of software interfacing with the hardware revocation pipeline in order to control operation of the hardware revocation pipeline. Note that it is not essential to have a software interface to the hardware revocation pipeline and in some examples the hardware revocation pipeline operates automatically.

In the example of FIG. 8 software 800 is able to send an instruction to the hardware revocation pipeline 206 to indicate what 802 memory to scan. This is not essential as the hardware revocation pipeline is arranged to scan all memory in some cases. However, by indicating what memory to scan efficiencies are gained through not scanning some regions of memory such as read-only memory, as requested by software executing on the memory constrained system.

In the example of FIG. 8 software 800 is able to send an instruction to the hardware revocation pipeline 206 to start 804 scanning now. This is not essential as in some cases the hardware revocation engine decides itself when to start scanning. An advantage of having the software instruct the hardware revocation engine when to start scanning is improved efficiency since the software can select a convenient time to start scanning which does not impact other processes executing on the memory constrained system. Another benefit of software-initiated revocation is power efficiency.

In the example of FIG. 8 the hardware revocation engine 206 is configured to make available to the software 800 two pieces of information: the last completed scan 806 done by the hardware revocation engine, and an indication 808 of whether a scan is currently in progress at the hardware revocation engine. There are several ways to enable the hardware to convey these two pieces of information to the software such as:

One counter that's incremented at the start and end of each revocation, such that an odd number indicates that revocation is in progress. Two counters, one that is incremented at the start and the other at the end of a revocation pass, such that if the values are different then revocation is in progress. A single counter that is incremented at the end of revocation, with software explicitly starting revocation and tracking the fact that revocation started without hardware assistance.

In some cases the counters count globally across multiple parties which are each able to trigger revocation.

In the example of FIGS. 4 to 7 the revocation state machine is not advanced on every clock cycle of the memory constrained system. The revocation state machine is stalled if the main pipeline has memory requests.

Potential conflict arises if the main pipeline issues a store to regions of the memory associated with pointers which are "in flight" in the revocation pipeline. How to deal with such potential conflict is now described with reference to FIG. 9.

Figure 9:
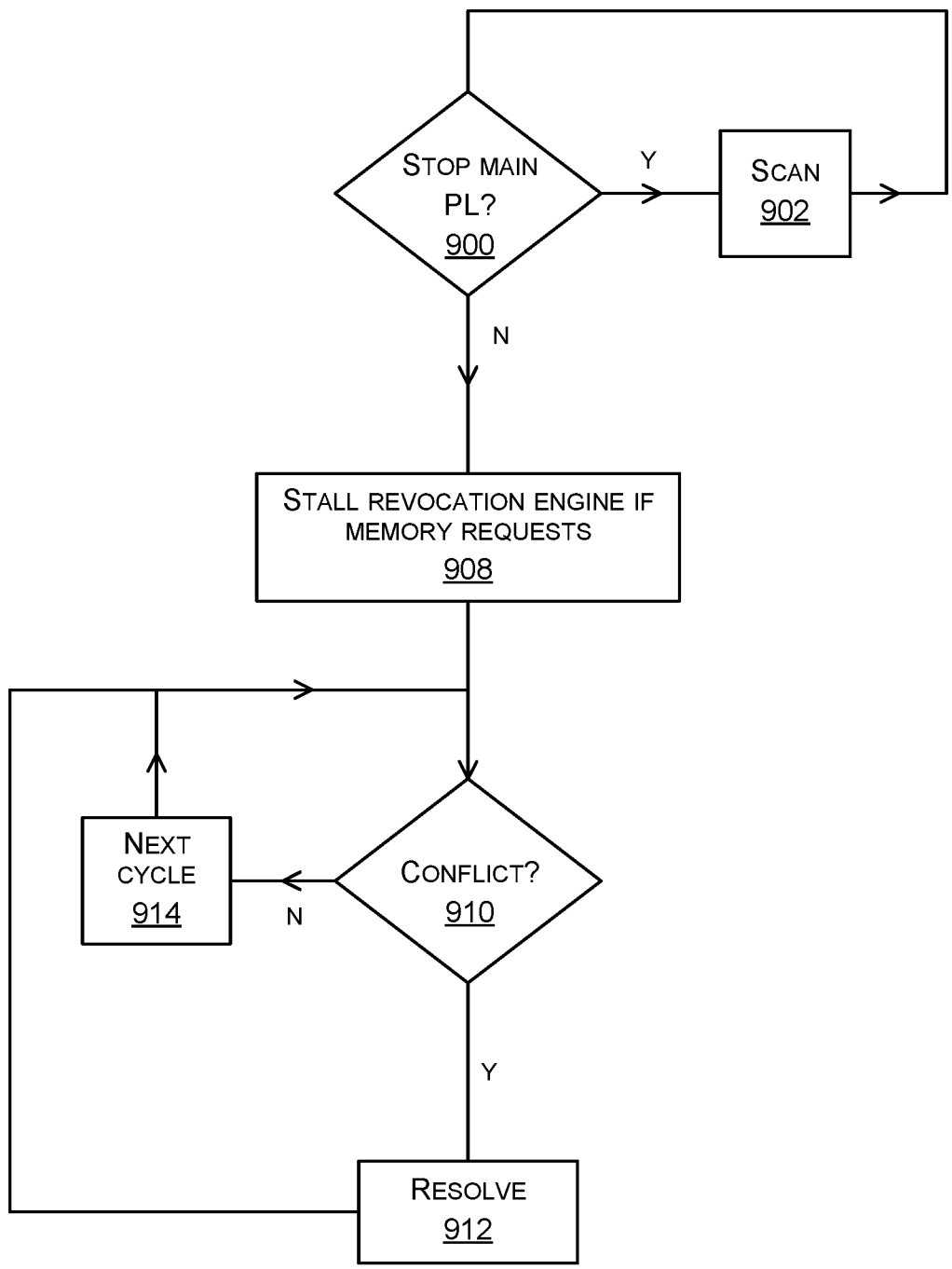
FIG. 9 is a flow diagram of a method of managing operation of a hardware revocation pipeline in conjunction with a pipeline of a main processor.

FIG. 9 is a flow diagram of a method of managing operation of a hardware revocation pipeline in conjunction with a pipeline of a main processor.

A design decision is made at check point 900 whether to stall the main pipeline during the revocation scan or not. If the decision is to stall then the main pipeline is stalled while the revocation scan 902 happens.

If the decision is to allow the main pipeline to continue, then the revocation pipeline is stalled 908 if the main pipeline makes memory requests as described with reference to FIGS. 4 to 7. In this case it is possible for conflict to arise where the main pipeline issues a store to memory referenced by a pointer which is in flight in the revocation pipeline. A check 910 is made for such a conflict.

The check 910 is either done by the revocation engine or done by the main pipeline.

If the check is done by the revocation engine it involves one or more of: snooping on memory stores made by the main pipeline, and receiving information about memory stores made by the main pipeline. In the case of receiving information about memory stores the main pipeline efficiently includes the information with a request to start scanning when it sends a start scanning request to the revocation pipeline.

If the check is done by the main pipeline it involves either snooping activity of the revocation pipeline or being informed of memory locations in flight in the revocation pipeline.

If there is no conflict found the process moves to the next cycle 914.

If the check at operation 910 indicates a conflict is present action is taken to resolve 912. The action performed by the revocation pipeline is to either discard its current state and backtrack or to intercept an instruction from the pipeline of the main processor to store to the memory location associated with the pointer in flight, and invalidate the instruction.

Alternatively, or in addition to the other examples described herein, examples include any combination of the following clauses:

Clause A. A hardware revocation engine for invalidating a pointer, that refers to a deallocated object, from memory in a memory constrained system, the hardware revocation engine comprising:
- a revocation pipeline coupled to a pipeline of a main processor of the memory constrained system;
- where the revocation pipeline shares access to memory with the main pipeline, the revocation pipeline comprising at least a first stage and a second stage: the second stage subsequent to the first stage, the revocation pipeline configured such that:
  - in a first cycle of the revocation pipeline, the first stage of the revocation pipeline loads a first pointer-sized value from the memory;
  - in a second cycle of the revocation pipeline:
    - the second stage checks whether the first loaded pointer-sized value is a pointer referring to deallocated memory and informs the first stage an outcome of the check; and
    - the first stage loads a second pointer-sized value from the memory; in a third cycle of the revocation pipeline:
  - in response to the outcome of the check indicating that the first loaded pointer-sized value is a pointer referring to deallocated memory, the first stage invalidates the first pointer-sized value; and
- the second stage checks whether the second loaded pointer-sized value is a pointer referring to deallocated memory.

Clause B. The hardware revocation engine of clause A wherein the second stage is configured to check whether the loaded pointer refers to deallocated memory by using a shadow memory, the shadow memory storing shadow bits indicating deallocated memory.

Clause C. The hardware revocation engine of clause A or clause B wherein the second stage is configured to check whether the loaded pointer-sized value is a non-pointer value or a pointer and in response to the loaded pointer-sized value being a non-pointer value, requesting another pointer-sized value from the memory.

Clause D. The hardware revocation engine of any preceding clause wherein the second stage is configured to check whether the loaded pointer-sized value is a non-pointer value or a pointer and in response to the loaded pointer-sized value being a pointer, loading a shadow bit corresponding to the memory referred to by the pointer.

Clause E. The hardware revocation engine of any preceding clause wherein the second stage is configured such that, in response to the loaded pointer referring to allocated memory waiting for a next cycle of the hardware revocation engine without informing the first stage.

Clause F. The hardware revocation engine of any preceding clause wherein the second stage is configured such that, in response to the loaded pointer referring to deallocated memory, sending a memory location identified by the loaded pointer to the first stage.

Clause G. The hardware revocation engine of any preceding clause configured to use pipeline parallelism.

Clause H. The hardware revocation engine of any preceding clause wherein the first stage has a port to the memory whereas the second stage does not.

Clause I. The hardware revocation engine of any preceding clause wherein the first stage invalidates the first pointer-sized value by one or more of: writing a non-pointer value to the memory location, erasing any pointer-distinguishing tag, removing any in-pointer permission flags that render the pointer unauthorized to access its target, adjusting the authorized bounds of the pointer to be zero-length.

Clause J. The hardware revocation engine of any preceding clause which is configured to scan a region of the memory by processing each pointer-sized value from the region using the first and second stages.

Clause K. The hardware revocation engine of any preceding clause wherein during operation of the revocation pipeline: either:
- the pipeline of the main processor is stalled; or
- the revocation pipeline is stalled in response to the main pipeline having a memory request.

Clause L. The hardware revocation engine of any preceding clause wherein during operation of the revocation pipeline the pipeline of the main processor continues to operate;
- and wherein the hardware revocation engine is configured to detect potential conflict whereby the pipeline of the main processor stores to a memory location associated with a pointer in flight in the hardware revocation engine,
- the hardware revocation engine arranged to detect the potential conflict either by snooping writing activity of the pipeline of the main processor or by being informed of memory locations written to by the pipeline of the main processor.

Clause M The hardware revocation engine of clause L wherein in response to detecting a potential conflict, the revocation pipeline is configured to either discard its current state and backtrack or to intercept an instruction from the pipeline of the main processor to store to the memory location associated with the pointer in flight, and invalidate the instruction.

Clause N The hardware revocation engine of any preceding clause wherein during operation of the revocation pipeline the pipeline of the main processor continues to operate;
- and wherein the pipeline of the main processor is configured to detect potential conflict whereby the pipeline of the main processor stores to a memory location associated with a pointer in flight in the hardware revocation engine;
- the pipeline of the main processor arranged to detect the potential conflict either by snooping activity of the revocation pipeline or by being informed of memory locations in flight in the revocation pipeline.

Clause O. A microprocessor comprising a hardware revocation engine as claimed in any preceding clause.

Clause P. A method performed by a hardware revocation engine for invalidating a pointer, that refers to a deallocated object, from memory in a memory constrained system, the method comprising:
- using or utilizing a revocation pipeline coupled to a pipeline of a main processor of the memory constrained system, the revocation pipeline having a first stage and a second stage, the second stage being subsequent to the first stage;
- sharing access to a memory between the main pipeline and the revocation pipeline:

in a first cycle of the revocation pipeline, using a first stage of the revocation pipeline to load a first pointer-sized value from the memory;
in a second cycle of the revocation pipeline:
using the second stage to check whether the first loaded pointer-sized value is a pointer referring to deallocated memory and to inform the first stage an outcome of the check; and
using the first stage to load a second pointer-sized value from the memory;
in a third cycle of the revocation pipeline:
in response to the outcome of the check indicating that the first loaded pointer-sized value is a pointer referring to deallocated memory, using the first stage to invalidate the first pointer-sized value;
using the second stage to check whether the second loaded pointer-sized value is a pointer referring to deallocated memory.

Clause Q A method performed by a hardware revocation engine for invalidating a pointer, that refers to a deallocated object, from memory in a memory constrained system, the method comprising:
using or utilizing a revocation pipeline coupled to a pipeline of a main processor of the memory constrained system, the revocation pipeline comprising a first stage and a second stage where the second stage is subsequent to the first stage;
sharing access to a memory between the main pipeline and the revocation pipeline; using the first stage of the revocation pipeline to load a pointer-sized value from the memory; using the second stage to check whether the loaded pointer-sized value is a pointer referring to deallocated memory and
in response to the loaded pointer-sized value being a pointer referring to deallocated memory, informing the first stage; and
using the first stage to invalidate the pointer.

Clause R The method of clause Q which is repeated for each pointer-sized value from a region of the memory.

Clause S The method of clause Q or clause R comprising using the first stage to load a second pointer-sized value from the memory whilst the second stage is performing the check.

Clause T The method of any of clauses Q to S comprising initiating the method when instructed to do so by the pipeline of the main processor and wherein the instruction is sent with an address to which the pipeline of the main processor is storing data for use by the revocation pipeline in detecting conflict.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

What is claimed is:

1. A method performed by a hardware revocation engine for invalidating a pointer, that refers to a deallocated object, from memory in a memory constrained system, the method comprising:
using a revocation pipeline coupled to a main pipeline of a main processor of the memory constrained system, the revocation pipeline comprising a first stage and a second stage where the second stage is subsequent to the first stage;
sharing access to a memory between the main pipeline and the revocation pipeline;
using the first stage of the revocation pipeline to load a pointer-sized value from the memory;
using the second stage to check whether the loaded pointer-sized value is a pointer referring to deallocated memory;
in response to the loaded pointer-sized value being a pointer referring to deallocated memory, informing the first stage; and
using the first stage to invalidate the pointer.

2. The method of claim 1 which is repeated for each pointer-sized value from a region of the memory.

3. The method of claim 1 comprising using the first stage to load a second pointer-sized value from the memory whilst the second stage is performing the check.

4. The method of claim 1 comprising initiating the method when instructed to do so by the pipeline of the main processor and wherein the instruction is sent with an address to which the pipeline of the main processor is storing data for use by the revocation pipeline in detecting conflict.

5. A hardware revocation engine for invalidating a pointer, that refers to a deallocated object, from memory in a memory constrained system, the hardware revocation engine comprising:
a revocation pipeline coupled to a main pipeline of a main processor of the memory constrained system;
where the revocation pipeline shares access to memory with the main pipeline, the revocation pipeline comprising at least a first stage and a second stage, the second stage subsequent to the first stage, the revocation pipeline configured such that:
in a first cycle of the revocation pipeline, the first stage of the revocation pipeline loads a first pointer-sized value from the memory;
in a second cycle of the revocation pipeline:
the second stage checks whether the first loaded pointer-sized value is a pointer referring to deallocated memory and informs the first stage an outcome of the check; and
the first stage loads a second pointer-sized value from the memory; and
in a third cycle of the revocation pipeline:
in response to the outcome of the check indicating that the first loaded pointer-sized value is a pointer referring to deallocated memory, the first stage invalidates the first pointer-sized value; and
the second stage checks whether the second loaded pointer-sized value is a pointer referring to deallocated memory.

6. The hardware revocation engine of claim 5 wherein the second stage is configured to check whether the loaded pointer refers to deallocated memory by using a shadow memory, the shadow memory storing shadow bits indicating deallocated memory.

7. The hardware revocation engine of claim 5 wherein the second stage is configured to check whether the loaded pointer-sized value is a non-pointer value or a pointer and in response to the loaded pointer-sized value being a non-pointer value, requesting another pointer-sized value from the memory.

8. The hardware revocation engine of claim 5 wherein the second stage is configured to check whether the loaded pointer-sized value is a non-pointer value or a pointer and in response to the second loaded pointer-sized value being a pointer, loading a shadow bit corresponding to the memory referred to by the pointer.

9. The hardware revocation engine of claim 5 wherein the second stage is configured such that, in response to the loaded pointer referring to allocated memory waiting for a next cycle of the hardware revocation engine without informing the first stage.

10. The hardware revocation engine of claim 5 wherein the second stage is configured such that, in response to the loaded pointer referring to deallocated memory, sending a memory location identified by the loaded pointer to the first stage.

11. The hardware revocation engine of claim 5 configured to use pipeline parallelism.

12. The hardware revocation engine of claim 5 wherein the first stage has a port to the memory whereas the second stage does not.

13. The hardware revocation engine of claim 5 wherein the first stage invalidates the first pointer-sized value by one or more of: writing a non-pointer value to the memory location, erasing any pointer-distinguishing tag, removing any in-pointer permission flags that render the pointer unauthorized to access its target, adjusting the authorized bounds of the pointer to be zero-length.

14. The hardware revocation engine of claim 5 which is configured to scan a region of the memory by processing each pointer-sized value from the region using the first and second stages.

15. The hardware revocation engine of claim 5 wherein during operation of the revocation pipeline, either:
the main pipeline of the main processor is stalled; or
the revocation pipeline is stalled in response to the main pipeline having a memory request.

16. The hardware revocation engine of claim 5 wherein during operation of the revocation pipeline the main pipeline of the main processor continues to operate;
and wherein the hardware revocation engine is configured to detect potential conflict whereby the main pipeline of the main processor stores to a memory location associated with a pointer in flight in the hardware revocation engine,
the hardware revocation engine arranged to detect the potential conflict either by snooping writing activity of the main pipeline of the main processor or by being informed of memory locations written to by the main pipeline of the main processor.

17. The hardware revocation engine of claim 16 wherein in response to detecting a potential conflict,
the revocation pipeline is configured to either discard its current state and backtrack or to intercept an instruction from the main pipeline of the main processor to store to the memory location associated with the pointer in flight, and invalidate the instruction.

18. The hardware revocation engine of claim 5 wherein during operation of the revocation pipeline the main pipeline of the main processor continues to operate;
and wherein the main pipeline of the main processor is configured to detect potential conflict whereby the main pipeline of the main processor stores to a memory location associated with a pointer in flight in the hardware revocation engine;
the main pipeline of the main processor arranged to detect the potential conflict either by snooping activity of the revocation pipeline or by being informed of memory locations in flight in the revocation pipeline.

19. A microprocessor comprising a hardware revocation engine as claimed in claim 5.

20. A method performed by a hardware revocation engine for invalidating a pointer, that refers to a deallocated object, from memory in a memory constrained system, the method comprising:
using a revocation pipeline coupled to a main pipeline of a main processor of the memory constrained system, the revocation pipeline having a first stage and a second stage, the second stage being subsequent to the first stage;
sharing access to a memory between the main pipeline and the revocation pipeline;
in a first cycle of the revocation pipeline, using a first stage of the revocation pipeline to load a first pointer-sized value from the memory;
in a second cycle of the revocation pipeline:
using the second stage to check whether the first loaded pointer-sized value is a pointer referring to deallocated memory and to inform the first stage an outcome of the check; and
using the first stage to load a second pointer-sized value from the memory; and
in a third cycle of the revocation pipeline:
in response to the outcome of the check indicating that the first loaded pointer-sized value is a pointer referring to deallocated memory, using the first stage to invalidate the first pointer-sized value; and
using the second stage to check whether the second loaded pointer-sized value is a pointer referring to deallocated memory.

* * * * *